United States Patent [19]

Stambaugh et al.

[11] Patent Number: 4,619,817
[45] Date of Patent: Oct. 28, 1986

[54] HYDROTHERMAL METHOD FOR PRODUCING STABILIZED ZIRCONIA

[75] Inventors: Edgel P. Stambaugh, Worthington; James H. Adair, Bexley; Ibrahim Sekercioglu, Dublin; Roger R. Wills, Solon, all of Ohio

[73] Assignee: Battelle Memorial Institute, Columbus, Ohio

[21] Appl. No.: 716,428

[22] Filed: Mar. 27, 1985

[51] Int. Cl.$^4$ ............................................. C01G 25/02
[52] U.S. Cl. ..................................... 423/266; 423/608; 501/103; 501/104
[58] Field of Search .................. 423/266, 608

[56] References Cited

U.S. PATENT DOCUMENTS

| | | | |
|---|---|---|---|
| 2,467,089 | 4/1949 | Marisic et al. | 423/608 |
| 3,334,962 | 8/1967 | Clearfield | 423/608 |
| 3,514,252 | 5/1970 | Levy et al. | 423/608 |
| 4,205,051 | 5/1980 | Takahashi et al. | 423/608 |
| 4,501,818 | 2/1985 | Rossi | 423/608 |

FOREIGN PATENT DOCUMENTS

| | | | |
|---|---|---|---|
| 26666 | 4/1981 | European Pat. Off. | 423/266 |
| 1010020 | 11/1965 | United Kingdom | 423/608 |
| 1337983 | 11/1973 | United Kingdom | 423/266 |

*Primary Examiner*—H. T. Carter
*Attorney, Agent, or Firm*—Klaus H. Wiesmann

[57] ABSTRACT

The invention is characterized by two main methods of producing stabilized or partially stabilized zirconia powders with controlled particle size by use of complexing agents and hydrothermal treatment. A further embodiment of the invention is characterized by a combination of the first two methods to produce powders containing more than one major particle size. The invention also allows use of low cost readily available starting material, controlled doping level and incorporation of dual constituents such as MgO, CaO; $Y_2O_3$, MgO; or $Y_2O_3$, CaO in the structure for production of stabilized zirconia. Triply stabilized zirconia containing $Y_2O_3$, MgO and CaO may also be produced. A final embodiment of the invention allows the production of dually and triply stabilized zirconia by hydrothermal treatment without the use of complexing agents.

33 Claims, 6 Drawing Figures

5A — FRACTURE SURFACE

5B — THERMALLY ETCHED SURFACE

HYDROTHERMAL METHOD FOR PRODUCING STABILIZED ZIRCONIA

FIELD OF THE INVENTION

This invention relates to a hydrothermal method for the production of fully and partially stabilized zirconia with controlled particle size by hydrothermal processing. The process further includes stabilization of zirconia with more than one stabilizer. Powders with special stabilization properties may be produced.

BACKGROUND OF THE INVENTION

In the last several years there has been an increasing interest in zirconia ceramics. This interest emanates largely from the discovery by Garvie, et al that partially stabilized zirconia (PSZ) ceramics could be fabricated with high strength and high fracture toughness. Garvie named the material "ceramic steel". Current applications include extrusion and drawing dies, cyclone heads, and tool bits. A large number of wear applications are envisaged. The largest potential application is in automotive engines where partially stabilized zirconia is being tested as a material for piston crowns, valve guides, and valve seatings. In the advanced diesel engines, currently under development, partially stabilized zirconia is the leading candidate material for the cylinder liner and piston cap.

The term stabilized zirconia as used herein refers to both fully and partially stabilized zirconia materials. Fully and partially stabilized zirconia can be fabricated with a number of dopants or stabilizers. Examples of these are yttria, calcium oxide, or magnesium. The quality of the powder and distribution of dopant in the powder play an important role in determining the microstructure of the ceramic after sintering. Since the effectiveness of the martensitic transformation responsible for stabilized zirconia's strength and fracture toughness depends upon its microstructural features, control of the physical and chemical properties are essential. The following factors affect the martensitic transformation in PSZ:

(1) Grain size and grain size distribution
(2) The transformation temperature
(3) Type and concentration of stabilizing agent
(4) Density of the sintered ceramic
(5) Purity and the presence of grain boundary phases
(6) Microstructural homogeneity
(7) Twin spacing
(8) Phase type and concentration.

Many of these factors can be related to the characteristics of the starting powder. For example, if the particle size of the starting powder is too large the strain energy in the grain will be sufficient to convert tetragonal grains spontaneously to the stable monoclinic form. A similar effect will occur if the ceramic does not have a high density due to lack of constraint by the surrounding matrix. This may also occur near porous areas in high density materials. Such effects are due to the presence of agglomerates in the starting powder.

The purity of the powder may affect the sintering characteristics of the powder as well as retention of the tetragonal phase through the formation of grain boundary phases which aid in sintering, but lower the high temperature properties of the ceramic as well as reduce the concentration of the stabilizer in the grains comprising the bulk of the ceramic. Use of a high quality powder is thus an essential prerequisite for producing optimum PSZ ceramics.

The objectives of microstructure control in any $ZrO_2$-containing ceramic are (a) to obtain as high a volume fraction of the tetragonal particles as possible, and (b) to optimize the particle size and size distribution. Large particles transform spontaneously and do not contribute to toughening while very small particles will require very high stresses for transformation. It is desirable to have a narrow particle-size distribution about the optimum size. This can be achieved by the present invention.

There are five main methods of producing partially stabilized zirconia powder: (1) powder mixing, (2) coprecipitation and decomposition, (3) vapor phase decomposition, (4) sol-gel processing, and (5) hydrothermal processing. The preferred method of preparing stabilized zirconia powder is the one that gives the best combination of cost and performance in terms of the cost of producing the powder and the powder's technical features. Mixing commercially available powders is an inexpensive method to prepare the powder, but may result in ceramics with poorer properties because solid state mixing does not always result in homogeneous distribution of the dopant throughout the powder.

A popular method for preparing stabilized zirconia powder is coprecipitation and decomposition in which salts of both the zirconia and the stabilizer are first precipitated from solution. This mixture of salts is then calcined to form the oxide. Fine reactive powders can be prepared by this method, but the calcination step requires a high temperature step to produce the oxide and may create agglomerates in the powder. Furthermore, the grinding operation required to break down the agglomerates can contaminate the powder. The vapor phase decomposition process is a thermal (or plasma assisted) chemical vapor decomposition reaction in which chlorides or metallorganic compounds of zirconia and the stabilizer are used as the starting materials. Powders made by this technique are generally extremely fine and difficult to handle because of their low bulk density. The process is also relatively expensive. In the sol-gel process alkoxides are polymerized and subsequently heat treated to form the oxide. Ultrafine powder is generally produced, but with appropriate engineering a wide variety of particle sizes can be prepared; however, unless excess water is avoided, the powder may contain chemically bound water which prevents the particles from being fully dense. The raw materials for this process, alkoxides of zirconia and yttria, are also relatively expensive. The method has the advantage that partially stabilized powder (not a mixture of zirconia and the oxide of the stabilizing agent) is produced directly.

The hydrothermal method of preparing zirconia powder in the present invention offers the best possibility of producing a high quality partially or fully stabilized zirconia powder at attractive production costs.

The objectives of the invention are to produce a high quality stabilized or partially stabilized zirconia powder from zirconyl nitrate, from zirconyl oxychloride, from zircon sands and other appropriate feedstocks, with controlled particle sizes that can be used to fabricate ceramics with superior properties, to produce a lower cost powder, and to produce a reactive free flowing powder exhibiting a high degree of crystallinity and crystalline perfection, a high degree of homogeneity and containing little or no bound water.

BRIEF DESCRIPTION OF THE INVENTION

Unlike many other powders that are mixtures, the process of the invention produces powders in which the individual crystallites themselves are partially or fully stabilized. Furthermore the process (1) enables the particle size to be controlled within narrow limits, (2) produces a very active, homogeneous powder, (3) gives rise to an agglomerate free powder or one containing only weak agglomerates, (4) produces a powder containing little or no chemically bound water, and (5) produces a powder with a high degree of crystallinity and crystalline perfection. These factors, together with the cost advantages of the hydrothermal process, and the potential use for using low cost starting materials (such as zircon sand or zirconyl oxychloride), are indicative of the invention's advantages.

The invention uses two basic approaches or a combination of these approaches to control particle size and achieve other desired objectives. The first is a colloidal method using zirconyl nitrate, zirconyl oxychloride or feed materials from zircon sands. In the first method the aqueous feed material is first titrated with a base such as NaOH, ammonium hydroxide or tetraethylammonium hydroxide to the appropriate pH of greater than about 9.0. Single or multiply stabilized zirconia with stabilizers chosen from MgO, CaO, and $Y_2O_3$ or other stabilizers with similar characteristics may be used. The material is then hydrothermally treated at appropriate temperatures and pressures and for a time adapted to give the stabilized powdered zirconia of appropriate particle size. Complexing agents may or may not be present. The powders produced by this method can range in size from 0.1 to 1 μm with smaller and larger sizes present according to process conditions.

The second approach uses the same feed solutions as above but must involve complexing agents and careful feedstock preparation. The feedstock is carefully titrated to a pH of about 9 at a slow rate adapted to produce a homogeneous solution that results in a homogeneous powder by hydrothermal precipitation. Again the material is hydrothermally treated at appropriate temperature, pressure, and for a time adapted to give the stabilized powdered zirconia. A typical complexing agent is ethylenediaminetetraacetic acid (EDTA). The resulting powder is in the particle size range from 0.5–3.0 μm.

A combination of the above two methods may be used to produce a powdered product containing more than one major particle size.

DETAILED DESCRIPTION OF THE INVENTION AND PREFERRED EMBODIMENT

Figure 1:
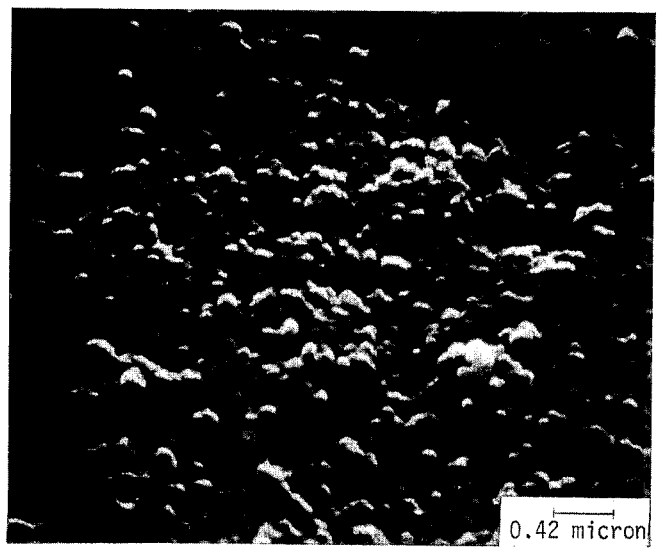
FIG. 1 is a photomicrograph of the powder produced by the colloidal method with EDTA complexing agent composed of $ZrO_2$ partially stabilized with 3.38% of MgO and 3.39% of $Y_2O_3$. (Ex. 24 Table III)

The invention is characterized by two methods of producing stabilized or partially stabilized zirconia powders with controlled particle size by hydrothermal treatment. A further embodiment of the invention is characterized by a combination of the first two methods to produce powders containing more than one major particle size. The invention also allows use of low cost readily available starting material, controlled doping level and incorporation of dual constituents such as MgO, CaO; $Y_2O_3$, MgO; or $Y_2O_3$, CaO in the structure for production of stabilized zirconia. Triply stabilized zirconia containing $Y_2O_3$, MgO and CaO may also be produced.

Zircon sand may be used as a source of zirconium ion to prepare powders via either the colloidal or homogeneous solution processes. Zircon sand is mixed with an alkali salt such as sodium hydroxide, sodium carbonate, etc. The mixture is heated to between 500° C. and 1000° C. to form water soluble alkali silicates. The alkali silicates are dissolved by a water leach. The resulting, undissolved material hereafter called the zircon frit is used to recover zirconium ions via the selective leaching of the same in acidic conditions. The undissolved zircon frit is recovered from the supernatant containing the dissolved alkali silicates. The recovered zircon frit is placed in suitable acid solutions such as hydrochloric acid, nitric acid, sulfuric acid, etc. and hydrothermally treated to selectively leach the zirconium ion values from the zircon frit feedstock. Typical temperatures to hydrothermally leach the zirconium ions range from 120° C. to 175° C. Typical acid concentrations range from 75 to 200 grams per liter. The undissolved sediment composed primarily of silica is removed from the zirconium rich supernatant. The supernatant is then used as the source of zirconium ions in the hydrothermal preparation of zirconia powders. Baddeleyite may also be used.

The zirconium rich supernatant is used to prepare feedstocks by titration with base solutions after addition of appropriate complexing agent and stabilizing agent(s) for either the colloidal or homogeneous solution approaches to produce the zirconia powders as further discussed below.

Preparation of stock solution. The preparation of stock solution is typical for all these examples using zirconyl nitrates. As alternatives zirconium sulphates, zirconium chlorides, zirconium hydroxides, zirconium carbonates, zirconium acetates, or zirconium oxides could be used as a feed material following similar preparation procedures. All concentrations are in moles per liter.

EXAMPLES 1-2

Stock solution was prepared by mixing 1M $ZrO_2(NO_3)_2$ and 1M $Ca(NO_3)_2 \cdot 4H_2O$ to produce a feedstock containing 0.176M $ZrO(NO_3)_2$ with 0.088M $Ca(NO_3)_2 \cdot 4H_2O$. No EDTA was added. This resulted in an initial molar ratio of zirconia to calcia of 2:1. The initial pH was 1.0. The sample was placed in a teflon lined container which was placed in an autoclave and treated at 193° C. for two hours. A white precipitate with a primary particle size of 1-3 μm that appeared heavily agglomerated was obtained. Analysis of the white precipitate confirmed that acid conditions as present here prevented the Ca++ ions from precipitating as the stabilizing agent in the zirconia. Accordingly higher pH values were tested.

EXAMPLES 3-6

This stock solution was prepared as Examples 1-2 but 0.176M EDTA was also added.

Six samples were prepared from these feedstocks using various ranges of pH from 1.0-8.23 as shown in Table I. Samples 1 and 2 were treated at low acidic pH. They illustrate that the stabilizing agent, in this case CaO, does not form a solid solution with zirconia at this low pH. This was confirmed by analysis of the precipitate of Sample 1. The level of CaO was within the limits of error of the analysis and was therefore essentially zero.

Samples 3-6 were treated at a slightly alkaline pH and using EDTA. Only Sample 4 obtained a precipitate. This precipitate consists of very fine particles (<0.1 μm) that appear slightly agglomerated. Particle size analysis using a deionized water solvent resulted in an average particle size of 0.05 μm. Since Sample 3 (ph 8.23) did not produce a powder, this example shows that the presence of stabilizing agents and still higher pH levels for this temperature and time are necessary to produce undoped zirconia.

Table II lists further examples of the homogeneous method of the invention. Here dually stabilized zirconia is produced. Feedstock material was prepared as follows:

EXAMPLES 7-12

A stock solution was prepared by diluting a 1M $ZrO(NO_3)_2$ with distilled water to produce a 0.338M solution. 0.338M $H_4EDTA$ was added to the above while stirring. 1.207M $NH_4OH$ was added to raise the pH to approximately 9.0. Appropriate quantities of calcium nitrate, magnesium nitrate and yttrium nitrate were added to give a dual concentration of 0.0845 moles/liter as shown in Table II.

EXAMPLES 14-15

A stock solution was prepared as above but appropriate NaOH was added to bring the pH to approximately 11.0.

EXAMPLES 16-17

These were prepared as in Examples 14-15 above except only a single stabilizing agent was added at a concentration of 0.158 and 0.164 moles per liter respectively. The zirconium oxynitride concentration also varied as shown in Table III.

Results for these examples show that it is apparent that between 1-3 hours at a pH above 9.0 are needed to produce a precipitate in that Example 7, 9, and 11 at 1 hour had no precipitate while Examples 8, 10, and 12 had a characteristic white precipitate. Example 13 illustrates that higher pH levels reduce the time needed to obtain a product.

The homogeneous solution method is based on the thermal decomposition of complexing agents present in the feedstock. This results in the precipitation of stabilized zirconia particles. This is accomplished by the chemical breakdown of zirconium ion—complexing agent couples at hydrothermal temperatures. Complexing agents are added to zirconium containing feedstocks initially at low pH prior to titration with base to the feedstock pH required to produce PSZ powders. The complexing agent is used to prevent the formation of metastable zirconium (hydrous) oxide precipitates which normally form as the pH is adjusted above pH 3. This requires the slow addition of base to the feedstock during titration accompanied by rapid stirring or mixing. If the base is added too fast, the zirconium ion—complex is not formed fast enough to prevent precipitation of the zirconium (hydrous) oxide.

The mode of action of the complexing agent in control of the particle size during precipitation operates by one or a combination of three mechanisms. Complexing agents may control the rate of crystal growth to produce larger particles by three mechanisms: their presence decreases the effective concentration of ions available for nucleation and growth; complex ions may adsorb at growing crystal surfaces inhibiting the delivery of growth ions to the crystal lattice; and the decoupling of ligand from complex usually requires a finite time. Thus, the latter limits ionic concentrations available for nucleation and growth at any given time.

Selection of a specific complexing agent is dependent on: (1) the equilibrium constants dictating the stability of the cation—complex agent bonds; (2) whether side reactions are possible resulting in undesirable products; (3) removal of complex agents from the final product; and (4) the thermal decomposition temperature of the complexing agent in solution.

For example, EDTA forms reasonably stable, water soluble complexes with zirconium ions. When pH of the zirconium ion feedstocks is adjusted to higher pH, the formation of the soluble zirconium—EDTA complex ion prevents formation of the relatively insoluble zirconium (hydrous) oxide. This results in a homogeneous feedstock solution at pH 9 prior to hydrothermal treatment. The thermally initiated chemical decomposition of the EDTA is used to release zirconium ions to the solution for precipitation. It is known that EDTA decomposes at about 215° C. to species with less affinity for metal ions. Thus, the chemical decomposition of the complexing agent or the decrease in affinity of the complexing agent for the zirconium ion under hydrothermal conditions may be used to release precipitating ions to the solution. This technique may be used to control the size of particles based on the feedstock pH and zirconium and complexing agent concentrations.

Additional complexing agents to EDTA include: carboxylic acids or salts thereof such as tartaric acid, citric acid, oxalic acid, etc; inorganic ions such as the salts or acids of nitrates, chlorides, sulfates, hydroxides, etc.; polyelectrolytic inorganic species such as sodium hexametaphosphate; aminocarboxylic acids or salts thereof in addition to EDTA such as HEDTA (hydroxyethylethylenediaminetriacetic acid), DTPA (diethylenetriaminepentaacetic acid), etc.; polyelectrolytic acids and salts thereof such as ammonium polymethylmethacrylate; organic phosphonic acids such as aminotri(methylenephosphonic acid); and organic amino compounds such as TEA (triethylamine) and TEOA (triethanolamine).

A general way to describe the homogeneous version of the invention would be as a process for the production of stabilized zirconia powders by hydrothermal treatment that comprises: Providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids; adding and mixing a complexing agent with the feedstock; mixing with the feedstock and complexing agent at least one and mixtures thereof of materials selected from the group consisting of nitrates, sulphates, chlorides, hydroxides, carbonates, acetates, and oxides of yttrium, magnesium and calcium; titrating the resulting mixture to a pH $\geq$ 9 with a base in a manner adapted to prevent precipitation of a hydrous oxide; treating the titrated mixture at hydrothermal conditions adapted to produce a stabilized zirconia precipitate; and separating the stabilized zirconia precipitate from the mixture.

The precipitate is then washed and the suspension may be used directly in slip, centripetal, or pressure casting. It may be directly spray dried or granulated as well as cold extruded. The precipitate may also be separated and dried to form a powder subsequent to washing. Washing may be done with an organic acid such as acetic acid and with deionized water. Separation may be by centrifugation, sedimentation or filtration.

The titrating step may use a base selected from the group consisting of $NH_4OH$, NaOH, or tetraethylammonium hydroxide and the hydrothermal treating conditions are for at least 5 minutes at about 350° C., for at least 15 minutes at about 300° C., for at least 45 minutes at about 250° C., and at least 1 hour at about 190° C. The autogenous pressure produced in the autoclave may be used.

The invention includes a stabilized zirconia precipitate or powder produced with the aforementioned homogeneous process. This precipitate or powder may be singly, dually or triply stabilized with oxides selected from the group consisting of calcium oxide, magnesium oxide, and yttrium oxide.

Specific conditions of the homogeneous method illustrated in Table II include: Providing an aqueous feedstock of zirconium nitrate; adding and mixing EDTA with the feedstock; mixing with the feedstock and EDTA at least one and mixtures thereof of materials selected from the group consisting of yttrium nitrate, magnesium nitrate and calcium nitrate; titrating the resulting mixture to a pH $\geq$ 9 with $NH_4OH$ in a manner adapted to prevent precipitation of a hydrous oxide; treating the titrated mixture at hydrothermal conditions of $\geq$ 190° C. for 1 hour at elevated autogenous pressures, which are adapted to produce a stabilized zirconia precipitate; and separating the stabilized zirconia precipitate from the mixture.

Another way, using sodium hydroxide, is by providing an aqueous feedstock of zirconium nitrate; adding and mixing EDTA with the feedstock; mixing with the feedstock and EDTA at least one and mixtures thereof of materials selected from the group consisting of yttrium nitrate, magnesium nitrate and calcium nitrate; titrating the resulting mixture to a pH $\geq$ 11 with NaOH in a manner adapted to prevent precipitation of a hydrous oxide; treating the titrated mixture at hydrothermal conditions of $\geq$ 190° C. for $\geq$ 1 hour at autogenous pressures, which are adapted to produce a stabilized zirconia precipitate; and separating the precipitate from the mixture.

EXAMPLES 18-20, 26-28

These examples use chemical solutions prepared in the manner of previous examples but with concentrations of zirconium oxynitrate as illustrated in Table III. EDTA is added to Examples 18-20 to give single stabilization with calcia, magnesia, or yttria.

EXAMPLES 21-25

These examples use chemical solutions prepared in the manner of previous examples but with concentrations of zirconium oxychloride as illustrated in Table III. EDTA is not used and dual stabilization is obtained for Examples 22, 24, 25. Examples 21 and 23 were performed to confirm results for unstabilized and singly stabilized powders of the prior art.

Table III lists results obtained for Examples 18 to 28 for hydrothermal treatment using process conditions that produce colloidal suspensions of the zirconium (hydrous) oxide plus stabilizing agent(s). The feedstock materials for these examples are prepared by the colloidal process technique. An important aspect of this technique is the proper mixing of feedstock materials at low pH. After mixing the solution is brought to proper pH (preferably 9.0 or above). If this procedure is not done correctly proper control of particle size will not result.

While EDTA is something present it is not needed at all of the conditions shown; however a hybrid powder of more than one major size distribution would always require EDTA or other complexing agent. FIG. 1 illustrates the powder obtained by the process of Example 24 of Table III.

The approach incorporated in the colloidal feedstock process is to obtain a stable dispersion of precursor hydrous oxide particles. The precursor hydrous oxide particles composed of the zirconium ions and stabilizing agent(s) ion(s) in atomic mixture within each particle are obtained by the rapid titration of a zirconium salt solution containing the stabilizing agent(s) using a suitable concentrated base solution such as ammonium hydroxide. Suitable zirconium salt solutions may be obtained from the dissolution of salts of zirconium oxychloride, oxynitrates, oxysulfates, etc. or from the zirconium ion containing solution resulting from the recovery of zirconium ions from the leaching of zircon frit or from baddeleyite. The stable dispersion of precursor hydrous oxide particles resulting from the titration described above is hydrothermally treated under the appropriate conditions to obtain 0.1 to 1 micron particles of the anhydrous oxide containing the stabilizing agent(s) in solid solution with the zirconium oxide. The use of complexing agents is optional in the colloidal feedstock approach. However, the complexing agents are preferred and may be used to control the degree of dispersion in the precursor feedstock.

Complexing agents are added to produce well dispersed feedstocks via surface charge effects. Complexing agents are used as such in both the homogeneous solutions and colloidal solutions. In the homogeneous solutions the complexing agents are used as a way to maintain a soluble complex species. In the colloidal solutions the complexing agent is used for its surface adsorbing properties. In both solutions the complexing ions prevent or minimize the formation of agglomerations and are used to control particle size. It is expected that particle size will not be controlled when the complexing agent is not present in sufficient quantities. In some reactions as with zirconium oxychlorides or zirconium chlorides, the complexing agent, the chloride ion, is already present but does not control particle size fully on its own. Additional complexing agents must be added to control the particle size of the precipitate appropriately. Other workers using a colloidal approach to produce singly stabilized zirconias but without the use of additional complexing agents were not able to obtain the particle sizes of the present invention.

A general way to describe the colloidal version of the invention would be as a process for the production of stabilized zirconia powders by hydrothermal treatment that provides an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids; adding and mixing a complexing agent with the feedstock; mixing with the feedstock and complexing agent at least one and mixtures thereof of materials selected from the group consisting of nitrates, sulphates, chlorides, hydroxides, carbonates, acetates, and oxides of yttrium, magnesium and calcium; titrating the resulting mixture to a pH$\geq$9 with a base in a manner adapted to precipitate hydrous oxide; treating the titrated mixture at hydrothermal conditions adapted to produce a stabilized zirconia precipitate; and separating the stabilized zirconia precipitate from the mixture.

The precipitate is then washed and the suspension may be used directly in slip, centripetal, or pressure casting. It may be directly spray dried or granulated as well as cold extruded. The precipitate may also be separated and dried to form a powder subsequent to washing. Washing may be done with an organic acid such as acetic acid and with deionized water. Separation may be by centrifugation, sedimentation or filtration.

The titrating step may use a base selected from the group consisting of NH$_4$OH, NaOH, or tetraethylammonium hydroxide and the hydrothermal treating conditions are for at least 5 minutes at about 350° C., for at least 15 minutes at about 300° C., for at least 45 minutes at about 250° C., and at least 1 hour at about 190° C. Autogenous pressure produced in the autoclave may be used.

The invention includes a stabilized zirconia precipitate or powder produced with the aforementioned colloidal process. This precipitate or powder may be singly, dually, or triply stabilized with oxides selected from the group consisting of calcium oxide, magnesium oxide, and yttrium oxide.

Specific conditions of the colloidal method illustrated in Table III include providing an aqueous feedstock selected from the group consisting of zirconium nitrate; adding and mixing EDTA with the feedstock; mixing with the feedstock and EDTA at least one and mixtures thereof of materials selected from the group consisting of yttrium nitrate, magnesium nitrate and calcium hydroxide; titrating the resulting mixture to a pH$\geq$9 with NaOH or NH$_4$OH in a manner adapted to precipitate a hydrous oxide; treating the titrated mixture at hydrothermal conditions of 190° C. for $\geq$1 hour at autogenous pressure, which are adapted to produce a stabilized zirconia precipitate; and separating the stabilized zirconia precipitate from the mixture.

More than one major particle size distribution, in this case two, may be obtained by a combination of the homogeneous and colloidal approaches in two ways. First, by preparing a homogenous solution, performing the titration step in the homogenous method, and adding a controlled amount of colloidal hydrous oxide particles. Second, by controlled addition of a base.

The first way of producing a stabilized zirconia powder having two major particle size distributions is by providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids; adding and mixing a complexing agent with the feedstock; mixing with the feedstock and complexing agent at least one and mixtures thereof of materials selected from the group consisting of nitrates, sulphates, chlorides, hydroxides, carbonates, acetates, and oxides of yttrium, magnesium and calcium; titrating the resulting mixture to a pH$\geq$9 with a base in a manner adapted to prevent precipitation of a hydrous oxide; adding colloidal hydrous oxide particles to the mixture; treating the mixture at hydrothermal conditions adapted to produce a stabilized zirconia precipitate; and separating the stabilized zirconia precipitate from the mixture.

Treatment of the precipitate is the same as that discussed earlier. The powder product of the process may be singly, dually, or triply stabilized.

The second way of producing a stabilized zirconia powder having two major particle size distributions is by providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids; adding and mixing a complexing agent with the feedstock; mixing with the feedstock and complexing agent at least one and mixtures thereof of materials selected from the group consisting of nitrates, sulphates, chlorides, hydroxides, carbonates, acetates, and oxides of yttrium, magnesium and calcium; titrating the resulting mixture to a pH$\geq$9 with a base in a manner adapted to precipitate only a portion of the precipitatable hydrous oxide; treating the titrated mixture at hydrothermal conditions adapted to produce a stabilized zirconia precipitate; and separating the stabilized zirconia precipitate from the mixture.

Again further treatment of the precipitate is the same as that discussed earlier. This powder product may also be singly, dually, or triply stabilized.

The advantages of the dually stabilized zirconia were discussed above. These advantages are also inherent in triply stabilized zirconias which may be produced by the aforementioned methods. It has further been discovered by the inventors that dually and triply stabilized zirconias may be produced by a colloidal method where no additional complexing agent is added. This latter method has the disadvantage that particle size is not as controlled and is expected to be smaller than that obtained with the additional complexing agent.

This colloidal method without the addition of complexing agent was used to obtain dually stabilized zirconia; however, it is expected that triply stabilized are also possible. This dually or triply stabilized zirconia is produced by providing an aqueous feedstock selected from the group consisting of zirconium nitrates, zirconium sulphates, zirconium chlorides, zirconium hydroxides, zirconium oxides and zirconium ion containing solutions derived from the hydrothermal leach of zircon sand or baddeleyite with mineral acids; mixing with the feedstock at least two and mixtures thereof of materials selected from the group consisting of nitrates, sulphates, chlorides, hydroxides, carbonates, acetates, and oxides of yttrium, magnesium and calcium; titrating the resulting mixture to a pH$\geq$9 with a base in a manner adapted to precipitate a hydrous oxide; treating the titrated mixture at hydrothermal conditions adapted to produce a stabilized zirconia precipitate; and separating the stabilized zirconia precipitate from the mixture.

The dually stabilized product may contain zirconia stabilized by CaO, MgO or $Y_2O_3$, CaO or $Y_2O_3$, MgO. The triply stabilized zirconia product would contain $Y_2O$, CaO and MgO.

Specific conditions shown in Table III for this special case of producing dually and triply stabilized zirconias includes providing an aqueous feedstock of zirconium oxynitrate or zirconium oxychloride; mixing with the feedstock at least two of materials selected from the group consisting of yttrium nitrate, magnesium nitrate and calcium hydroxide; titrating the resulting mixture to a pH$\geq$9 with NaOH or $NH_4OH$ in a manner adapted to precipitate a hydrous oxide; treating the titrated mixture at hydrothermal conditions of 190° C. for $\geq$1 hour at autogenous pressure, which are adapted to produce a stabilized zirconia precipitate; and separating the precipitate from the mixture.

Overall the results indicate it is possible to tailor properties of the stabilized zirconia powders. It had been determined that compositional control is most easily accomplished for the yttria partially stabilized zirconias and dual partially stabilized zirconia powders with yttria as one of the stabilizing agents. A summary of the chemical compositions of selected powders is shown in Table IV. In all cases evaluated, a uniform distribution of the stabilizing agents has been indicated by energy dispersive x-ray analysis. However, the ability to prepare a stabilized powder is strongly dependent on the feedstock pH. If the feedstock pH is less than 9.0, the powders may contain very little of the stabilizing agent and the powder is monoclinic. In special cases no precipitation will take place if the feedstock pH is not within a certain pH range. When stabilizing agents are present in the precipitated powders, the phase present in all powders synthesized to date is cubic.

It is possible to produce stabilized zirconia powders with a wide range of different particle sizes. The shape of particles in all powders produced to date have been equiaxial. The median particle sizes range from 0.05 microns to 3.60 microns. Typically the median particle size is between 0.2 and 0.5 microns. Specific surface areas of selected powders have ranged from 30 $m^2$ per g to 150 $m^2$ per gram.

Figure 2:
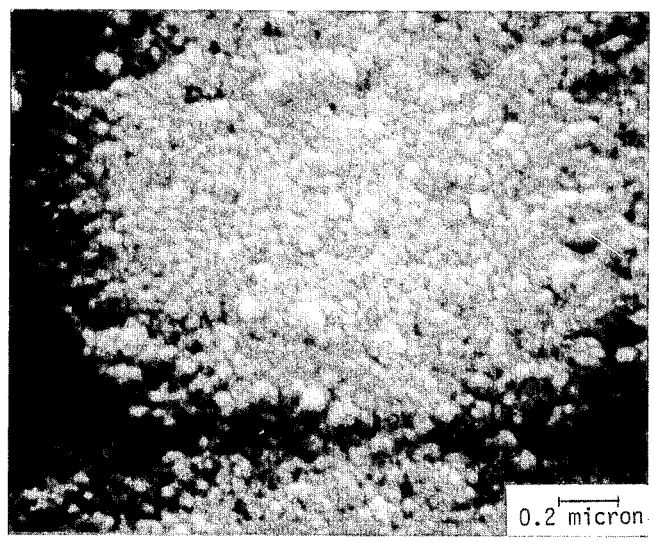
FIG. 2 is a photomicrograph of the powder produced by the colloidal method with EDTA complexing agent composed of $ZrO_2$ partially stabilized with 3.29% of $Y_2O_3$. (Ex. 20 Table III)
Figure 3:
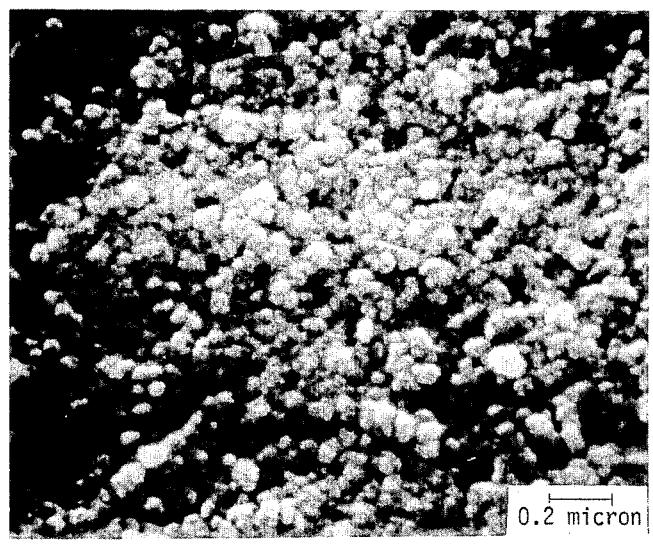
FIG. 3 is a photomicrograph of the powder produced by the colloidal method of the invention composed of $ZrO_2$ partially stabilized with 2.75% of CaO. (Ex. 18 Table III)
Figure 4:
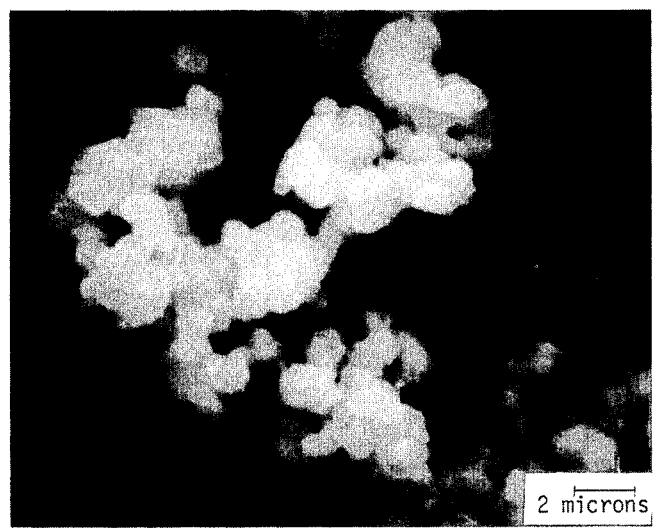
FIG. 4 is a photomicrograph of the powder produced by the homogenous solution method of the invention composed of $ZrO_2$ partially stabilized with 2.01% of CaO. (Ex. 16 Table II)

Particle size analyses and crystallite domain size determined by XRD line broadening indicate that powders produced from hydrous oxide feedstocks are microcrystalline. Average equivalent spherical diameters calculated from the specific surface areas compared to the median particle sizes determined by particle size analysis indicates that the particles shown in FIGS. 1 through 3 are microcrystalline. This finding is supported by the XRD patterns for these types of particles. The particles shown in the photomicrograph in FIG. 4 produced from a homogeneous solution feedstock are single crystals.

Partially stabilized powders composed of microcrystalline particles compact to reasonably high bulk densities. The compaction behavior for three microcrystalline powders were tested. Bulk densities up to 3.20 g per $cm^3$ were achieved at 340 MPa (50 ksi) uniaxial pressures. This corresponds to approximately 55 percent of theoretical density. The yttria partially stabilized zirconia used had a median particle size of approximately 0.4 microns. This powder compacted to about 50 percent of theoretical density. This may be due to some agglomerates present in the powder greater than 1 micron. The agglomerates levels may be reduced by shorter reaction hydrothermal times.

Figure 5:
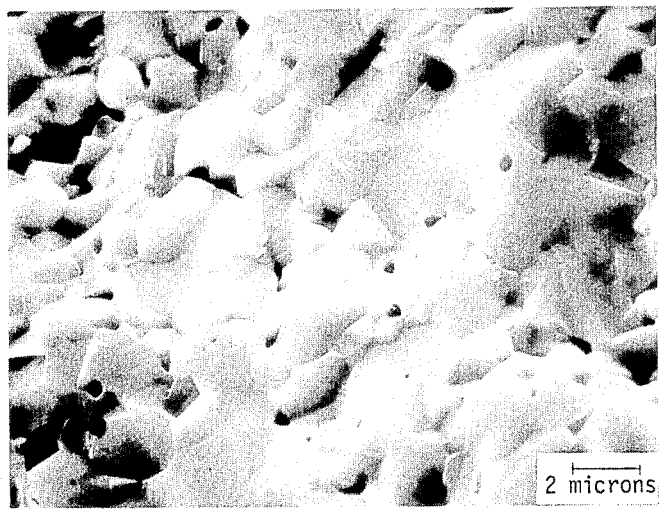
FIG. 5 shows photomicrographs of a sintered sample obtained by use of powders from Example 20, Table III. View 5A shows a fracture surface and View 5B a thermally etched surface of the sintered sample.
Figure 5:
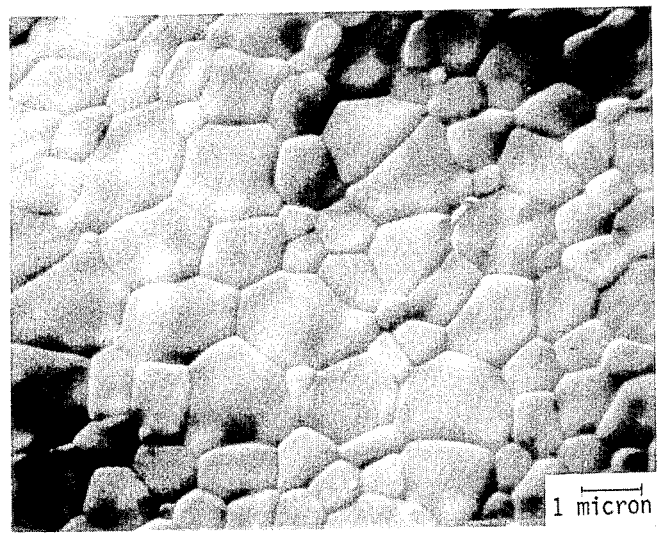

Preliminary sintering studies have been performed, primarily on the yttria partially stabilized zirconia powders because of the lower temperatures required to consolidate them. Results indicate that hydrothermally derived partially stabilized zirconia powders are highly reactive if the particle size is in the range 0.2 to 1.0 micron. Sintering conditions for the powders have not yet been optimized (the optimum sintering temperature appears to be between 1350° and 1450° C.), but the microstructure of a sintered 3.3 mole percent YPSZ shown in FIG. 5 indicates that a high density (>95 percent theoretical) was achieved by sintering at 1350° C.

It is believed that the advantages of the dually stabilized zirconia are at least twofold. First, lower levels of the higher cost yttria can be used to obtain similar physical properties since CaO or MgO are also complexed therewith. Second, the dual stabilization will allow lower sintering temperatures since lower amounts of calcia or magnesia are employed. The physical features of the product powder, their particle size, narrow particle size distribution, and low agglomeration indicate that they should sinter at a relatively low temperature, produce a sintered ceramic with minimal variation in properties and be an easy powder to handle. This latter feature will result in cost savings since granulation to produce a free flowing powder will not be necessary. The ability to produce the powder by a chemical reaction in the liquid phase will enable a high purity powder to be produced. The process enables the stabilizer to be distributed in each particle homogeneously on an atomic scale. This unique feature of the process means that the high temperature heat treatment needed to form partially stabilized zirconia particles from mixed oxides is avoided as is the possibility of grain growth resulting from this heat treatment. It also ensures that variations in properties due to nonuniform distribution of the stabilizer in the ceramic are avoided. The ability to add one or more stabilizers to the basic process means that several zirconia powder products can be made by small modifications to the main process.

An advantage of the combined method mentioned above is that it would be possible to produce powders with two particle size distributions. This would allow better initial packing of the powders prior to sintering and improve the quality of the final product.

Other variations on the basic method of both the colloidal and homogeneous approaches include seeding, where the hydrous oxides are separated from the aqueous medium and redispersed in a fresh aqueous medium having desired conditions; conducting the hydrothermal treatment under an inert, reducing or oxidizing atmosphere; conducting the hydrothermal treatment under an overpressure of an added gas; conducting the hydrothermal treatment at temperatures ranging from 175° C. to 350° C. and the corresponding autogenous steam pressure or the autogenous steam pressure plus the added pressure of an inert, reducing, or oxidizing atmosphere for a period of time greater than 5 minutes; using an organic acid to wash the precipitate, acetic acid may be the organic acid; and conducting the process as a continuous or batch type process.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

TABLE I

| Example | $ZrO(NO_3)_2 \cdot 5H_2$ | $Ca(NO_3)_2$ | $Mg(NO_3)$ | $Y_2(NO_3)_3$ | $H_4EDTA$ | $NH_4$ | pH | Hydrothermal Condition | Precipitate* | XRD Phase |
|---|---|---|---|---|---|---|---|---|---|---|
| 1 | 0.176 | 0.088 | 0 | 0 | 0 | 0 | 1.0 | 193° C./2 hr | White | Cubic |
| 2 | 0.176 | 0.176 | 0 | 0 | 0 | 0 | 0.95 | 193° C./2 hr | White | Cubic |
| 3 | 0.176 | 0 | 0 | 0 | 0.176 | 0.503 | 8.23 | 193° C./2 hr | None | |
| 4 | 0.176 | 0.0088 | 0 | 0 | 0.176 | 0.503 | 8.19 | 193° C./2 hr | White | Cubic |
| 5 | 0.176 | 0.088 | 0 | 0 | 0.176 | 0.503 | 7.38 | 193° C./2 hr | None | |
| 6 | 0.176 | 0.176 | 0 | 0 | 0.176 | 0.503 | 7.17 | 193° C./2 hr | None | |

*After washing powder with 10 w/o 16 Acetic Acid and Deionized Water
All concentrations in moles/liter

TABLE II

Hemogeneous Solution Approach

| Example | $ZrO(NO_3)_2 \cdot 5H_2O$ | $Ca(NO_3)_2$ | $Mg(NO_3)_2$ | $Y(NO_3)_3$ | $H_4EDTA$ | $NH_4$ | NaOH | pH | Hydrothermal Condition | Precipitate* | XRD Phase |
|---|---|---|---|---|---|---|---|---|---|---|---|
| 7 | 0.338 | 0.0845 | 0.0845 | 0 | 0.338 | 1.207 | 0 | 9.03 | 194° C./1 hr | None | |
| 8 | 0.338 | 0.0845 | 0.0845 | 0 | 0.338 | 1.207 | 0 | 9.03 | 190° C./3 hr | White | Cubic |
| 9 | 0.338 | 0 | 0.0845 | 0.0845 | 0.338 | 1.202 | 0 | 9.01 | 194° C./1 hr | None | |
| 10 | 0.338 | 0 | 0.0845 | 0.0845 | 0.338 | 1.202 | 0 | 9.01 | 190° C./3 hr | White | Cubic |
| 11 | 0.338 | 0.0845 | 0 | 0.0845 | 0.338 | 1.207 | 0 | 9.01 | 194° C./1 hr | None | |
| 12 | 0.338 | 0.0845 | 0 | 0.0845 | 0.338 | 1.207 | 0 | 9.01 | 190° C./3 hr | White | Cubic |
| 13 | 0.338 | 0.0845 | 0.0845 | 0 | 0.338 | 0 | 4.85 | 11.16 | 194° C./1 hr | White | Cubic |
| 14 | 0.338 | 0 | 0.0845 | 0.0845 | 0.338 | 0 | 4.87 | 11.08 | 194° C./1 hr | White Gel | |
| 15 | 0.338 | 0.0845 | 0 | 0.0845 | 0.338 | 0 | 4.86 | 11.04 | 194° C./1 hr | White Gel | |
| 16 | 0.307 | 0.158 | 0 | 0 | 0.307 | 1.201 | 0 | 8.98 | 250° C./4 hr | White | Cubic |
| 17 | 0.324 | 0.164 | 0 | 0 | 0.324 | 2.45 | 0 | 9.30 | 220° C./3 hr | White | Cubic |

*After washing powder with 10 w/o Acetic Acid and Deionized Water
All Concentrations in moles/liter

TABLE III

Colloidal Approach

| Example | $ZrO(NO_3)_2 \cdot 5H_2O$ | EDTA | $Ca(OH)_2$ | $Mg(NO_3)_2$ | $Y(NO_3)_3$ | $NH_4OH$ | NaOH | pH | Hydrothermal Condition | Precipitate* | XRD Phase |
|---|---|---|---|---|---|---|---|---|---|---|---|
| 18 | .336 | .788 | .164 | 0 | 0 | 0 | 4.3 | 12.01 | 190° C./3 hr | White | Cubic |
| 19 | .25 | .592 | 0 | .124 | 0 | 0 | 3.25 | 11.87 | 190° C./3 hr | White | Cubic |
| 20 | .21 | .492 | 0 | 0 | .103 | 0 | 5.39 | 12 | 190° C./3 hr | White | Cubic |
| 21 | 1.18** | 0 | 0 | .243 | 0 | 0 | 0 | 8.05 | 250° C./3 hr | White | Cubic |
| 22 | 1.18** | 0 | 0 | .243 | .025 | 0 | 0 | 7.74 | 250° C./4 hr | White | Cubic |
| 23 | 1.18** | 0 | 0 | 0 | 0 | 0 | 0 | 3.14 | 250° C./5 hr | White | Monoclinic |
| 24 | 1.28** | 0 | 0 | .376 | .0394 | 0 | .29 | 12.73 | 250° C./3.5 hr | White | Cubic |
| 25 | 1.48** | 0 | .314 | 0 | .0458 | 0 | .25 | 12.77 | 250° C./3.5 hr | White | Cubic |
| 26 | 0.388 | 0 | 0.1 | 0 | 0 | .431 | 0 | 8.97 | 300° C./0.5 hr | White | Cubic |
| 27 | 0.43 | 0 | 0.21 | 0 | 0 | 1.14 | 0 | 9.00 | 190° C./2 hr | White | Cubic |
| 28 | 0.20 | 0 | 0 | 0.135 | 0 | 0.002 | 0 | 9.00 | 220° C./3 hr | White | Cubic |

*After washing with 10 w/o Acetic Acid and Deionized Water
All concentrations in moles/liter
**Zirconium ion added as zirconium oxychloride.

TABLE IV

LEVELS OF STABILIZING AGENTS FOR SELECTED ZIRCONIA ALLOY POWDERS

| Powder From Example Number | CaO | MgO | $Y_2O_3$ |
|---|---|---|---|
| 1 | .04 | .08 | .02 |
| 8 | 1.08 | .32 | .02 |
| 10 | .01 | .24 | .53 |
| 12 | .77 | .09 | .43 |
| 13 | 2.15 | 2.21 | .02 |
| 16 | 2.01 | .11 | .02 |
| 18 | 2.75 | .26 | .20 |
| 19 | .01 | 3.20 | .03 |
| 20 | .02 | .01 | 3.29 |
| 21 | .00 | .74 | 0.24 |
| 22 | .00 | 2.64 | 1.79 |
| 24 | .00 | 3.38 | 3.39 |
| 25 | 3.36 | .00 | 2.00 |
| 26 | 5.54 | .00 | .00 |
| 27 | 9.78 | .00 | .00 |

All compositions in mole percent.

We claim:

1. A process for the production of stabilized zirconia powders by hydrothermal treatment comprising:

a. providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids;

b. adding and mixing a complexing agent with the feedstock, wherein the complexing agent forms (1) a stable soluble complex, (2) does not have side reactions resulting in undesirable products, (3) is capable of being removed from the final product, and (4) the complexing agent decomposes at hydrothermal conditions or has decreased affinity for the complexed ion;

c. mixing with the feedstock of b. at least one and mixtures thereof of materials selected from the group consisting of nitrates, sulphates, chlorides, hydroxides, carbonates, acetates, and oxides of yttrium, magnesium and calcium;

d. titrating the resulting mixture to a $pH \geqq 9$ with a base in a manner adapted to prevent precipitation of a hydrous oxide;

e. treating the titrated mixture at hydrothermal conditions adapted to produce a stabilized zirconia precipitate; and f. separating the stabilized zirconia precipitate from the mixture.

2. The process of claim 1 further comprising washing the precipitate.

3. The process of claim 2 further comprising slip, centripetal, or pressure casting the washed precipitate directly.

4. The process of claim 2 further comprising spray drying or granulating the washed precipitate directly.

5. The process of claim 2 further comprising cold extruding the washed precipitate directly.

6. The process of claim 2 further comprising separating and drying the precipitate to form a powder.

7. The process of claim 2 wherein the washing step uses an organic acid and deionized water.

8. The process of claim 1 wherein the titrating step uses a base selected from the group consisting of NH$_4$OH, NaOH, or tetraethylammonium hydroxide.

9. The process of claim 1, wherein the hydrothermal conditions in step e. further comprise heating for at least 5 minutes at about 350° C., for at least 15 minutes at about 300° C., for at least 45 minutes at about 250° C. and for at least 1 hour at about 190° C.

10. The process of claim 1 further comprising hydrothermally treating the mixture in an added inert gas.

11. The process of claim 1 further comprising separating the precipitate by centrifugation, sedimentation or filtration.

12. A process for the production of stabilized zirconia powders by hydrothermal treatment comprising:

a. providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids;

b. adding and mixing a complexing agent with the feedstock, wherein the complexing agent forms (1) a stable soluble complex, (2) does not have side reactions resulting in undersirable products, (3) is capable of being removed from the final product, and (4) the complexing agent decomposes at hydrothermal conditions or has decreased affinity for the complexed ion;

c. mixing with the feedstock of b. at least one and mixtures thereof of materials selected from the group consisting of nitrates, sulphates, chlorides, hydroxides, carbonates, acetates, and oxides of yttrium, magnesium and calcium;

d. titrating the resulting mixture to a $pH \geqq 9$ with a base in a manner adapted to precipitate a hydrous oxide in a colloidal suspension;

e. treating the titrated mixture at hydrothermal conditions adapted to produce a stabilized zirconia precipitate; and f. separating the stabilized zirconia precipitate from the mixture.

13. The process of claim 12 further comprising washing the precipitate.

14. The process of claim 13 further comprising slip, centripetal, or pressure casting the washed precipitate directly.

15. The process of claim 13 further comprising spray drying or granulating the washed precipitate directly.

16. The process of claim 13 further comprising cold extruding the washed precipitate directly.

17. The process of claim 13 further comprising separating and drying the precipitate to form a powder.

18. The process of claim 12 wherein the titrating step uses a base selected from the group consisting of from NH$_4$OH, NaOH, or tetraethylammonium hydroxide.

19. The process of claim 12 wherein the hydrothermal conditions in step e. further comprises heating for at least 5 minutes at about 350° C., for at least 15 minutes at about 300° C., for at least 45 minutes at about 250° C. and for at least 1 hour at about 190° C.

20. The process of claim 12 further comprising collecting the precipitate by centrifugation, sedimentation or filtration.

21. A process for the production of stabilized zirconia powders having two major particle size distributions by hydrothermal treatment comprising:

a. providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids;

b. adding and mixing a complexing agent with the feedstock, wherein the complexing agent forms (1) a stable soluble complex, (2) does not have side reactions resulting in undersirable products, (3) is capable of being removed from the final product, and (4) the complexing agent decomposes at hydrothermal conditions or has decreased affinity for the complexed ion;

c. mixing with the feedstock of b. at least one and mixtures thereof of materials selected from the group consisting of nitrates, sulphates, chlorides, hydroxides, carbonates, acetates, and oxides of yttrium, magnesium and calcium;

d. titrating the resulting mixture to a $pH \geqq 9$ with a base in a manner adapted to prevent precipitation of a hydrous oxide;

e. adding colloidal hydrous oxide particles to the mixture of d.

f. treating the mixture of e. at hydrothermal conditions adapted to produce a stabilized zirconia precipitate; and g. separating the stabilized zirconia precipitate from the mixture.

22. The process of claim 21 further comprising washing the precipitate.

23. The process of claim 22 further comprising slip, centripetal, or pressure casting the washed precipitate directly.

24. The process of claim 22 further comprising spray drying or granulating the washed precipitate directly.

25. The process of claim 22 further comprising cold extruding the washed precipitate directly.

26. The process of claim 22 further comprising separating and drying the precipitate to form a powder.

27. The process of claim 21 wherein the titrating step uses $NH_4OH$, NaOH, or tetraethylammonium hydroxide.

28. The process of claim 21 wherein the hydrothermal conditions in step f. further comprise heating for at least 5 minutes at about 350° C., for at least 15 minutes at about 300° C., for at least 45 minutes at 250° C. and for at least 1 hour at 190° C.

29. The process of claim 21 further comprising separating the precipitate by centrifugation, sedimentation or filtration.

30. A process for the production of stabilized zirconia powders having two major particles size distributions by hydrothermal treatment comprising:
   a. providing an aqueous feedstock selected from the group consisting of zirconium nitrates, zirconium sulphates, zirconium chlorides, zirconium hydroxides, zirconium carbonates, zirconium acetates, zirconium oxides and zirconium ion containing solutions derived from the hydrothermal leach of zircon sand or baddeleyite with mineral acids;
   b. adding and mixing a complexing agent with the feedstock, wherein the complexing agent forms (1) a stable soluble complex, (2) does not have side reactions resulting in undesirable products, (3) is capable of being removed from the final product, and (4) the complexing agent decomposes at hydrothermal conditions or has decreased affinity for the complexed ion;
   c. mixing with the feedstock of b. at least one and mixtures thereof of materials selected from the group consisting of nitrates, sulphates, chlorides, hydroxides, carbonates, acetates, and oxides of yttrium, magnesium and calcium;
   d. titrating the resulting mixture to a $pH \geq 9$ with a base in a manner adapted to precipitate only a portion of the precipitatable hydrous oxide;
   e. treating the titrated mixture at hydrothermal conditions adapted to produce a stabilized zirconia precipitate; and
   f. separating the stabilized zirconia precipitate from the mixture.

31. A process for the production of stabilized zirconia powders by hydrothermal treatment comprising:
   a. providing an aqueous feedstock of zirconium nitrate;
   b. adding and mixing EDTA with the feedstock;
   c. mixing with the feedstock of b. at least one and mixtures thereof of materials selected from the group consisting of yttrium nitrate, magnesium nitrate and calcium nitrate;
   d. titrating the resulting mixture to a $pH \geq 9$ with $NH_4OH$ in a manner adapted to prevent precipitation of a hydrous oxide;
   e. treating the titrated mixture at hydrothermal conditions of $\geq 190°$ C. for $\geq 1$ hour at autogenous pressures, which are adapted to produce a stabilized zirconia precipitate; and
   f. separating the stabilized zirconia precipitate from the mixture.

32. A process for the production of stabilized zirconia powders by hydrothermal treatment comprising:
   a. providing an aqueous feedstock of zirconium nitrate;
   b. adding and mixing EDTA with the feedstock;
   c. mixing with the feedstock of b. at least one and mixtures thereof of materials selected from the group consisting of yttrium nitrate, magnesium nitrate and calcium nitrate;
   d. titrating the resulting mixture to a $pH \geq 11$ with NaOH in a manner adapted to prevent precipitation of a hydrous oxide;
   e. treating the titrated mixture at hydrothermal conditions of $\geq 190°$ C. for $\geq 1$ hour at autogenous pressures, which are adapted to produce a stabilized zirconia precipitate;
   f. separating the stabilized zirconia precipitate from the mixture.

33. A process for the production of stabilized zirconia powders by hydrothermal treatment comprising:
   a. providing an aqueous feedstock selected from the group consisting of zirconium nitrate;
   b. adding and mixing EDTA with the feedstock;
   c. mixing with the feedstock of b. at least one and mixtures thereof of materials selected from the group consisting of yttrium nitrate, magnesium nitrate and calcium hydroxide;
   d. titrating the resulting mixture to a $pH \geq 9$ with NaOH or $NH_4OH$ in a manner adapted to precipitate a hydrous oxide;
   e. treating the titrated mixture at hydrothermal conditions of 190° C. for $\geq 1$ hour at autogenous pressures, which are adapted to produce a stabilized zirconia precipitate; and
   f. separating the precipitate from the mixture.

* * * * *

UNITED STATES PATENT AND TRADEMARK OFFICE
CERTIFICATE OF CORRECTION

PATENT NO. : 4,619,817

DATED : October 28, 1986

INVENTOR(S) : Edgel P. Stambaugh, James H. Adair, Ibrahim Sekercioglu, and Roger R. Wills It is certified that error appears in the above-identified patent and that said Letters Patent are hereby corrected as shown below:

Column 7, line 25, "cohsisting" should read -- consisting --;

Column 13, TABLE I, (footnote) "16" should be deleted;

Column 13, TABLE II, (Title), "Hemogeneous" should read -- Homogeneous --;

Column 14, TABLE IV, line 60 "2.64" should read -- 2.62 --;

Signed and Sealed this

Tenth Day of February, 1987

Attest:

DONALD J. QUIGG

Attesting Officer

Commissioner of Patents and Trademarks